United States Patent [19]

Takemori et al.

[11] Patent Number: 5,026,568

[45] Date of Patent: Jun. 25, 1991

[54] SOYBEAN SNACK AND A PROCESS FOR PRODUCING IT

[75] Inventors: Toshio Takemori, Tokyo; Masaru Ishiga, Kasukabe; Toshimi Ootsubo, Urawa, all of Japan

[73] Assignee: Lotte Company Limited, Tokyo, Japan

[21] Appl. No.: 369,346

[22] Filed: Jun. 19, 1989

[30] Foreign Application Priority Data

Jun. 22, 1988 [JP] Japan ................. 63-152231

[51] Int. Cl.$^5$ ............. A21D 2/00; A23L 1/10
[52] U.S. Cl. ................. 426/549; 426/550; 426/618; 426/622; 426/634
[58] Field of Search ........... 426/549, 550, 634, 618, 426/622

[56] References Cited

U.S. PATENT DOCUMENTS

| | | | |
|---|---|---|---|
| 2,627,465 | 2/1953 | Pettibone | 426/550 |
| 3,141,776 | 7/1964 | Kaufmann et al. | 426/550 |
| 3,780,188 | 12/1973 | Tsen et al. | 426/549 |
| 4,124,727 | 11/1978 | Rockland et al. | 426/549 |
| 4,208,476 | 6/1980 | Tsao | 426/458 |
| 4,440,793 | 4/1984 | Seki | 426/549 |

FOREIGN PATENT DOCUMENTS

| | | |
|---|---|---|
| 5387 | 2/1978 | Japan ................. 426/550 |
| 56-21568 | 2/1981 | Japan . |
| 56-42554 | 4/1981 | Japan . |
| 59-140845 | 8/1984 | Japan . |
| 59-162837 | 9/1984 | Japan . |
| 60-114159 | 6/1985 | Japan . |
| 61-43969 | 3/1986 | Japan . |
| 61-254149 | 11/1986 | Japan . |
| 62-3753 | 1/1987 | Japan . |

OTHER PUBLICATIONS

Baking for People with Food Allergies, U.S. Dept. of Agriculture, Home & Garden Bulletin, No. 147.
Edible Soy Flour and Soy Grits, Hafner Soybean Digest, vol. 19, No. 8, 6/59, pp. 8 and 9.

*Primary Examiner*—Donald E. Czaja
*Assistant Examiner*—D. Workman
*Attorney, Agent, or Firm*—Young & Thompson

[57] ABSTRACT

A soybean snack comprising 25-70 parts by weight of soybean powder of whole grain or soybean powder of hull-removed grain and 75-30 parts by weight of starch and/or cereal flour as main components is disclosed. This snack may be produced by grinding soybean of whole grain or soybean of hull-removed grain, adding to 25-70 parts by weight of the resultant soybean powder of whole grain or soybean powder of hull-removed grain with 75-30 parts by weight of starch and/or cereal flour and water, optionally adding a seasoning, a leavening agent and the like, adding an alkaline agent to make a pH of dry material after steam treatment 7.5-9.5, treating with steam to form a dough which has an elasticity and a plasticity which are substantially equivalent to those of the touch of rice cakes, rolling, molding, and forming a dry material to fry or to bake.

6 Claims, No Drawings

SOYBEAN SNACK AND A PROCESS FOR PRODUCING IT

FIELD OF THE INVENTION

The present invention relates to a snack food and a process for producing it, and in particular relates to a soybean snack and a process for producing it using substantially whole soybean material, not having a disagreeable unripe odor characteristic of soybean, having a flavorful soybean taste characteristic of soybean as an expressed taste, having a good leavening property and a good mouth-feel, components from soybean being homogeneously distributed throughout the food.

BACKGROUND OF THE INVENTION

Soybean is a good food material which has rich nutrients and is good for the health, so that various snack foods utilizing soybean have been developed. For example, a snack food in which dry soybean juice is used as a material is disclosed in Japanese laid-open patent application No. 48-85755, snack foods in which a residue of soybean juice extract or "Okara" which is a by-product of the production of soybean juice, soybean oil, soybean protein or the like are disclosed in Japanese patent publication No. 56-34257, Japanese laid-open patent application No. 56-55154 or Japanese laid-open patent application No. 59-162837, and a snack food in which soybean protein is used as a material is disclosed in Japanese laid-open patent application No. 62-111640. Any of these utilizes only a part of the soybean material as a powder of soybean juice extracted from soybean, a residue of soybean juice extraction a soybean protein in which only a protein portion of soybean is used or the like, so that it is not intended to wholly utilize nutrients characteristic of soybean and distinct flavorful soybean taste. Therefore, these cannot reproduce the whole flavor and taste completely and are not necessarily sufficient to further emphasize the flavor and taste of soybean.

It is necessary for utilizing soybean "as a whole" to overcome several difficulties to obtain a snack food. An ideal soybean snack has not been realized in which substantially the whole part of soybean material is used, there is no disagreeable unripe odor characteristic of soybean, having a flavorful soybean taste characteristic of soybean as an expressed taste, having a good leavening property and a good mouth-feel, components from soybean being homogeneously distributed in the whole of the food. For example, in Japanese patent publication No. 55-2255, it is intended to utilize whole soybean to produce a baked confection, in which problems arising from physical property of soybean such as "bean-removal" are mainly intended to be avoided, soybean being ground before addition of cereal flours to treat with steam before molding in a shape of cylinder or soybean-like shape to dry to add to a material for rice confection, so that the components from soybean are not homogeneously distributed in the whole food in the resultant baked confection. Generally, when a snack is desired in which whole soybean is used, the content of the components from soybean is increased to express taste and flavor of soybean material, and the components from soybean are homogeneously distributed in the whole part of food, the leavening property of the snack worsens due to fat components which exist in the soybean material. In the above Japanese patent publication No. 55-2255, this problem is avoided by distributing the components from soybean in the whole food not homogeneously. In order to obtain a soybean material food of good mouth-feel without worsening the leavening property of snack, for example, as disclosed in Japanese patent publication No. 63-5067, a soybean material which suffered degreasing treatment is used. However, the degreasing treatment worsens the distinct flavor and taste of soybean. Even if a good leavening is obtained, it is difficult to obtain a soybean snack in which the flavor and taste of soybean can be emphasized to express.

As the components of taste and flavor of soybean material, a flavorful soybean taste characteristic of soybean are included as well as a disagreeable unripe odor characteristic of soybean which is not preferable as a flavor of food. When a snack which has an expressed soybean taste is made, the disagreeable unripe odor characteristic of soybean is simultaneously emphasized without special treatment, and such snack has no value as a product. Namely, in order to realize an ideal soybean snack, it is necessary that among the components of taste and flavor of soybean material only the disagreeable unripe odor characteristic of soybean is removed, to retain the flavorful soybean taste characteristic of soybean, and that scattering of other components than the disagreeable unripe odor during removing the disagreeable unripe odor is prevented, simultaneously with which problems arising from components are prevented which may affect the production of snack such as fat components which have not been removed to maintain the flavor and taste of soybean.

Conventionally, although it has been believed that soybean is good for the health, the disagreeable unripe odor characteristic of soybean has been hated, so that a snack of expressed soybean taste has been prevented. And soybean has a relatively large amount of fat which inhibits leavening and precludes a soft mouth-feel, so that a soybean snack of good taste has not been obtained. It is desired to provide a snack which does not have the disagreeable unripe odor characteristic of soybean, has the flavor of soybean, and has a soft mouth-feel.

SUMMARY OF THE INVENTION

The object of the present invention is to provide a soybean snack and a process for producing it using substantially whole soybean material, not having a disagreeable unripe odor characteristic of soybean, having a flavorful soybean taste characteristic of soybean as an expressed taste, having a good leavening property and a good mouth-feel, components from soybean being homogeneously distributed throughout the food.

According to the present invention, there is provided a soybean snack comprising 25–70 parts by weight of soybean powder of whole grain or soybean powder of hull-removed grain and 75–30 parts by weight of starch and/or cereal flour as main components characterized in that a steam-treated dough after steam treatment has an elasticity and a plasticity which are substantially equivalent to those of the touch of rice cake, and that it contains such an amount of alkaline agent that a pH of a dry material after steam treatment is 7.5–9.5.

Also according to the present invention, there is provided a process for producing a soybean snack characterized by grinding soybean of whole grain or soybean of hull-removed grain, adding to 25–70 parts by weight of the resultant soybean powder of whole grain or soybean powder of hull-removed grain with 75–30 parts by weight of starch and/or cereal flour and water, optionally adding a seasoning, a leavening agent and the like, adding an alkaline agent to make a pH of dry material after steam treatment 7.5-9.5, treating with steam to form a dough which has an elasticity and a plasticity which are substantially equivalent to those of the touch of rice cake, rolling, molding, and forming a dry material to fry or to bake.

PREFERRED EMBODIMENTS OF THE INVENTION

As the soybean powder of whole grain or as the soybean powder of hull-removed grain which are used in the present invention, those which may be obtained as powder or paste by grinding soybean or hull-removed soybean may be used.

It is preferable that the soybean powder of whole grain or the soybean powder of hull-removed grain is a deodorized soybean powder of whole grain or soybean powder of hull-removed grain.

The deodorized soybean powder may be prepared, for example, by heat-treating whole grain or hull-removed grain, cooling and grinding, wherein it is preferable that the heat treatment is carried out in a steam treatment apparatus at 0.2 kg/m$^2$ for 5 minutes to grind with a melanger.

Preferably, the ratio of the deodorized soybean powder which may be the deodorized whole grain or soybean powder of hull-removed grain to the starch and/or cereal flour may be that the deodorized soybean powder is 30-60 parts by weight and the starch and/or cereal flour is 70-40 parts by weight, in order to obtain a better soybean snack. When the deodorized soybean powder is not more than 25 parts by weight, the flavor and taste of soybean becomes poor to reduce the value of soybean snack for emphasizing the flavor and taste of soybean, and when the deodorized soybean powder is not less than 70 parts by weight, leavening becomes bad to give hard mouth-feel, so that both of the above case are not preferable. It should be noted that all defined component ratios herein are on the basis of weight.

It is preferable that the soybean snack contains such an amount of alkaline agent that pH of the dry material after heat treatment is 8.0-9.0. When pH is not more than 7.5, the mouth-feel becomes hard to make dissolution in mouth bad, and when pH is not less than 9.5, the flavor and taste of soybean is worsened by the alkaline, so that both of the above case are not preferable. All alkaline agents which may added to food may be used as the alkaline agent of the present invention, for example, sodium bicarbonate may preferably be used.

A material mixture which is adjusted to a certain pH is steam-treated to form a dough for a preliminary raw material. The steam treatment may be carried out at a pressure not more than 5.0 kg/m for 30 minutes at most, preferably for 5-10 minutes. Although the suitable steam treatment time may be optionally defined in the range described in the above on the basis of kind of material, mixing ratio, pH or the like, such a standard may be used that a dough has an elasticity and a plasticity substantially equivalent to those of the touch of rice cake. Thus, alpha-conversion of starch may be carried out suitably to give a good taste. And then rolling, molding, drying, frying, baking and calcining may be carried out to process the material, so that a soybean snack with a desired flavor and taste may be obtained.

The disagreeable unripe odor characteristic of soybean may be removed by using the deodorized soybean powder of whole grain or soybean powder of hull-removed grain, and more complete maintaining of the flavor and taste of soybean may be achieved by preventing scattering of the components other than the disagreeable unripe odor during the deodorizing treatment. For example, after a pressurized steam treatment at 0.2 kg/m$^2$ for 5 minutes, little destruction of useful components of soybean takes place to remove only the component of the disagreeable unripe odor relatively specifically, for which it is postulated that the disagreeable unripe odor is unstable to steam, or it is extracted more rapidly than other components by steam.

A soybean snack corresponding to a desired flavor and taste of soybean and mouth-feel may be obtained by formulating materials in the specific range optionally. A certain amount of leavening may be obtained by frying without pH adjustment, while pH may be adjusted to reduce the inhibiting effect of fat on leavening to obtain a snack of more soft mouth-feel and good dissolution in mouth.

The steam treatment may be carried out in the above conditions with such a standard that a dough has an elasticity and a plasticity substantially equivalent to those of the touch of rice cake, and the alpha-conversion of starch may be carried out for obtaining a good taste, after which the specified following processes are carried out for production, so that a flavorful and tasty soybean taste may be obtained.

According to the present invention, there is provided a soybean snack using substantially whole soybean material, not having a disagreeable unripe odor characteristic of soybean, having a flavorful soybean taste characteristic of soybean as an expressed taste, having a good leavening property and a good mouth-feel, components from soybean being homogeneously distributed in the whole of the food.

The present invention will be explained in detail by examples, only by which the present invention is not limited.

EXAMPLES 1-4

Tests were carried out for a relation between the amount of deodorized soybean powder, flavor and mouth-feel. Materials were blended according to the formulation shown in Table 1, water was added for steam treatment to roll with a rolling roll to 1 mm thickness to form a sheet, drying was carried out after molding to obtain a raw material with a water content of 12-15%, which was further heated and dried to fry for adding taste to produce a soybean snack. As a result of examination by experts, good soybean snacks were obtained in Examples 1-4, while that of Comparative test 1 had little flavor and taste of soybean, and that of Comparative test 2 had a good flavor and taste of soybean but had a hard mouth-feel.

TABLE 1

|  | Comp. 1 | Ex. 1 | Ex. 2 | Ex. 3 | Ex. 4 | Comp. 2 |
|---|---|---|---|---|---|---|
| Soybean powder |  | 30 |  | 50 |  |  |
| Deodorized soybean powder | 20 |  | 40 |  | 60 | 75 |
| Starch | 80 | 70 | 60 | 50 | 40 | 25 |
| Water |  |  | suitable amount |  |  |  |
| Flavor & taste | x | Δ | o | Δ | o | o |
| Mouth-feel | o | o | o | o | Δ | x |
| (Total) | x | o | o | o | o | x | where o indicates good, Δ indicates fair, and x indicates poor.

Furthermore, results of eating test of these soybean snacks by 50 panelists were summarized in Table 2 as a search result of preference for soybean snack.

TABLE 2

| | Samples | | | | | |
|---|---|---|---|---|---|---|
| | Comp. 1 | Ex. 1 | Ex. 2 | Ex. 3 | Ex. 4 | Comp. 2 |
| Main materials | | | | | | |
| Soybean powder | | 30 | | 50 | | |
| Deodorized soybean powder | 20 | | 40 | | 60 | 75 |
| Starch | 80 | 70 | 60 | 50 | 40 | 25 |
| Evaluation (by 50 panelists) | | | | | | |
| Good soybean flavor & taste | 4 | 32 | 48 | 31 | 45 | 39 |
| Good mouth-feel | 31 | 47 | 50 | 49 | 32 | 2 |
| Good in total | 4 | 38 | 48 | 40 | 32 | 2 |

EXAMPLES 5-7

Tests were carried out for deference of mount-feel by addition of alkaline agent (pH adjustment). Materials were blended according to the formulation shown in Table 3, sodium bicarbonate was added to carry out steam treatment, so that a raw material was obtained as described in Examples 1-3. pHs of the raw materials are shown in the Table. These were further fried for adding taste to produce a soybean snack as Examples 1-3, with which comparison for mouth-feel, dissolution in mouth and flavor and taste was carried out. As a result of examination by experts, as shown in Table 3, increasing pH to achieve a specific pH made mouth-feel and dissolution in mouth, while excess increasing was found to worsen the flavor and taste of soybean.

TABLE 3

| | Comp. 3 | Ex. 5 | Ex. 6 | Ex. 7 | Comp. 4 |
|---|---|---|---|---|---|
| Soybean powder | | 40 | | | |
| Deodorized soybean powder | 40 | | 40 | 40 | 40 |
| Starch | 60 | 60 | 60 | 60 | 60 |
| Sodium bicarbonate | — | 0.5 | 0.7 | 1.1 | 1.5 |
| Water | | suitable amount | | | |
| (pH of dry material) | 6.7 | 7.9 | 8.7 | 9.3 | 9.7 |
| Mouth-feel | Δ | o | o | o | o |
| Dissolution in mouth | x | o | o | o | o |
| Flavor & taste | o | Δ | o | Δ | x |
| (Total) | x | o | o | o | x |

Furthermore, results of eating test of these soybean snacks by 50 panelists were summarized in Table 4 as a search result of preference for soybean snack.

TABLE 4

| | Samples | | | | |
|---|---|---|---|---|---|
| | Comp. 3 | Ex. 5 | Ex. 6 | Ex. 7 | Comp. 4 |
| Main materials | | | | | |
| Soybean powder | | 40 | | | |
| Deodoried soybean powder | 40 | | 40 | 40 | 40 |
| Starch | 60 | 60 | 60 | 60 | 60 |
| Sodium bicarbonate | 0 | 0.5 | 0.7 | 1.1 | 1.5 |
| pH | 6.7 | 7.9 | 8.7 | 9.3 | 9.7 |
| Evaluation (by 50 panelists) | | | | | |
| Good mouth-feel | 18 | 37 | 49 | 47 | 45 |
| Good dissolution in mouth | 9 | 32 | 46 | 45 | 43 |
| Good soybean flavor & taste | 36 | 31 | 48 | 29 | 3 |
| Good in total | 9 | 35 | 47 | 30 | 3 |

What is claimed is:

1. A soybean snack comprising 25-70 parts by weight of whole grain soybean powder or soybean powder of hull-removed grain and 75-30 parts by weight of at least one of starch and cereal flour as main components in the form of a steam-treated dough having elasticity and plasticity, and containing an amount of alkaline agent such that the pH of dry material of said snack after steam treatment is 7.5-9.5.

2. The soybean snack according to claim 1, wherein the whole grain soybean powder or the soybean powder of hull-removed grain is a deodorized whole grain soybean powder or soybean powder of hull-removed grain.

3. A process for producing a soybean snack comprising grinding whole grain soybean or soybean of hull-removed grain, adding to 25-70 parts by weight of the resultant soybean powder 75-30 parts by weight of at least one of starch and cereal flour and water, adding an alkaline agent in an amount sufficient to make the pH of dry material after steam treatment 7.5-9.5, treating with steam to form a dough having elasticity and plasticity, rolling, molding, and forming a dry material to fry or to bake.

4. The process according to claim 3, wherein the whole grain soybean powder or the soybean powder of hull-removed grain is a deodorized soybean powder.

5. The soybean snack according to claim 1, comprising as main components about 40 parts by weight of whole grain soybean powder or soybean powder of hull-removed grain and about 60 parts by weight of starch.

6. The soybean snack according to claim 5, further comprising from about 0.5 to about 1.1 parts by weight sodium bicarbonate as said alkaline agent.

* * * * *